United States Patent
Ford et al.

(10) Patent No.: US 6,577,420 B1
(45) Date of Patent: Jun. 10, 2003

(54) REDUCTION OF MODAL NOISE IN STEP-INDEX FIBER BUNDLES

(75) Inventors: Joseph E. Ford, Oakhurst, NJ (US); Ashok V. Krishnamoorthy, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/427,682

(22) Filed: Oct. 27, 1999

(51) Int. Cl.[7] .............................................. H04B 10/00
(52) U.S. Cl. ....................... 359/152; 359/154; 359/173; 385/14; 385/27; 385/28; 385/89; 385/115
(58) Field of Search ................................ 359/152, 154, 359/173; 385/14, 27, 28, 29, 88, 89, 115, 123

(56) References Cited

U.S. PATENT DOCUMENTS

| | | | | |
|---|---|---|---|---|
| 4,232,938 A | * | 11/1980 | Dabby et al. ............... | 350/96.2 |
| 5,138,675 A | * | 8/1992 | Schofield ..................... | 385/28 |
| 5,432,630 A | * | 7/1995 | Lebby et al. ................ | 359/152 |
| 5,914,976 A | * | 6/1999 | Jayaraman et al. ........... | 372/50 |
| 6,061,159 A | * | 5/2000 | Walsh ......................... | 359/152 |
| 6,075,634 A | * | 6/2000 | Casper et al. ................ | 359/152 |

* cited by examiner

Primary Examiner—Leslie Pascal
Assistant Examiner—M. R. Sedighian

(57) ABSTRACT

A step-index fiber bundle utilized in communicating optical Gigabit Ethernet signals from multiple Gigabit Ethernet optical transceiver interfaces directly to an array of Gigabit Ethernet receivers and lasers integrated on an optoelectronic-VLSI chip, with the step-index fibers in the bundle having core sizes between 50 um and 60 um to facilitate the fabrication of the bundles. The step-index fiber is selected to exhibit a numerical aperture between 0.19 and 0.25 to cooperate with a standard Gigabit Ethernet 50 um graded-index fiber jumper between each individual transmitter interface and the fiber bundle, and with a standard Gigabit Ethernet 62.5 um graded-index fiber jumper between each individual receiver interface and the corresponding integrated laser in ensuring that substantially all of the light coupled from each transmitter interface is collected by the corresponding step-index fiber and delivered to the corresponding detectors on the optoelectronic-VLSI chip and so that substantially all of the light coupled into the step-index fiber from the integrated lasers is collected and delivered to the corresponding individual receiver interface.

18 Claims, 2 Drawing Sheets

REDUCTION OF MODAL NOISE IN STEP-INDEX FIBER BUNDLES

BACKGROUND OF THE INVENTION

1. Field of the Invention

This invention relates to the communication of optical Gigabit Ethernet signals from multiple Gigabit Ethernet optical transceiver interfaces directly to an array of Gigabit Ethernet receivers and lasers integrated on an optoelectronic-VLSI (Very Large Scale Integration) chip. More particularly, this invention relates to the delivery of several hundred (or more) Gigabit Ethernet optical signals using a fiber bundle to a chip containing several hundred (or more) parallel Gigabit Ethernet optical transceivers.

2. Description of the Related Art

As is known and understood, 850 nm Gigabit Ethernet (GbE) optical links are currently implemented with discrete transceivers over graded-index multimode fibers. To achieve multiple Gigabit Ethernet links, multiple discrete transceivers, of necessity, have to be used with individual separate fibers, either packaged into individual fiber ferrules or in one-dimensional arrays.

Analysis has shown, however, that several issues have to be resolved before optoelectronic-VLSI technologies can be used to provide such Gigabit Ethernet compliant links. For example, because multimode fibers can support many different propagating modes along the length of the fiber, there exists a potential for interference between such modes. This has been determined to lead to either constructive or destructive interference between the modes, resulting in a speckle pattern at the detector that shifts and changes when the amount of light coupled into each mode group varies as a result of fluctuations in the spectrum of the source, changing environmental conditions, vibration, etc. In an attempt to suppress this modal noise, large-area multi-transverse-mode vertical cavity surface emitting lasers (VCSELS) have been employed—but, such emitters are difficult to integrate in large arrays, because such VCSELS typically require larger operating currents, and hence have higher power dissipation.

To be useful for data networking applications, furthermore, each transceiver must conform to one of the standardized data transmission formats. Amongst the most recent is the new IEEE-approved Gigabit Ethernet standard where the data transmission rate for a single GbE channel is 1.25 Gigabits-per-second. Such standard provides for optical transmission over 50 um core-size as well as 62.5 um core-size graded-index multimode fibers at a wavelength of 850 nm. Trying to make an array of hundreds (and more) of multimode graded-index fibers arranged into a two-dimensional fiber bundle, however, has proven to be quite inefficient using present technology. While arrays of multimode step-index fibers are able to be manufactured efficiently, the step-index fibers do not meet the GbE standard for optical transmission—and, primarily, because of the modal noise problem.

SUMMARY OF THE INVENTION

As will become clear from the following description, with the present invention, a new and improved system results which provides parallel communication between multiple discrete Gigabit Ethernet optical transceivers and an optoelectronic-VLSI chip containing hundreds (or more) of optical transceivers using a fiber-bundle composed of these step-index fibers. Power dissipation on the chip will be seen to be reduced by using power-efficient vertical cavity surface emitting lasers, and modal noise will be seen to be prevented from deteriorating the link by the utilization of standard Gigabit Ethernet graded-index fiber jumpers between each individual transmitter interface and the fiber bundle on the one hand, and between each individual receiver interface and the corresponding integrated laser on the other hand. In particular, and as will be seen, the step-index fibers are selected of a core size and numerical aperture to insure that substantially all of the light coupled from each transmitter interface into a standard Gigabit Ethernet 50 um graded-index fiber jumper will be captured by the corresponding step-index fibers in the bundle and delivered to the corresponding detectors on the optoelectronic-VLSI chip in a power efficient manner. At the same time, a standard Gigabit Ethernet 62.5 um graded-index fiber jumper is employed between each individual receiver interface and the corresponding integrated laser to insure that substantially all of the light coupled into the step-index fiber from the integrated lasers will be captured by the corresponding 62.5 um jumper and delivered to the corresponding individual receiver interface.

In a preferred embodiment of the invention, such step-index fiber bundle was selected with a core size varying from 50 um to 60 um, and with an effective numerical aperture between 0.19 and 0.25, effectively greater than the numerical aperture of the 50 um graded-index fiber jumper and less than the numerical aperture of the 62.5 um graded index fiber jumper. By relaxing the constraints on the core size of the step-index fibers, the step-index fiber bundle becomes easier to manufacture and also reduces its cost.

As will be appreciated by those skilled in the art, a stepindex fiber bundle array—which can be fabricated using present-day technologies—, in this manner, can be employed in supporting the Gigabit Ethernet standard for graded-index fibers in optical communication, thus allowing for integration of a large number of transceivers onto a single chip.

BRIEF DESCRIPTION OF THE DRAWINGS

These and other features of the invention will be more clearly understood from a consideration of the following description, taken in connection with the accompanying drawings, in which.

DETAILED DESCRIPTION OF THE INVENTION

Figure 1:
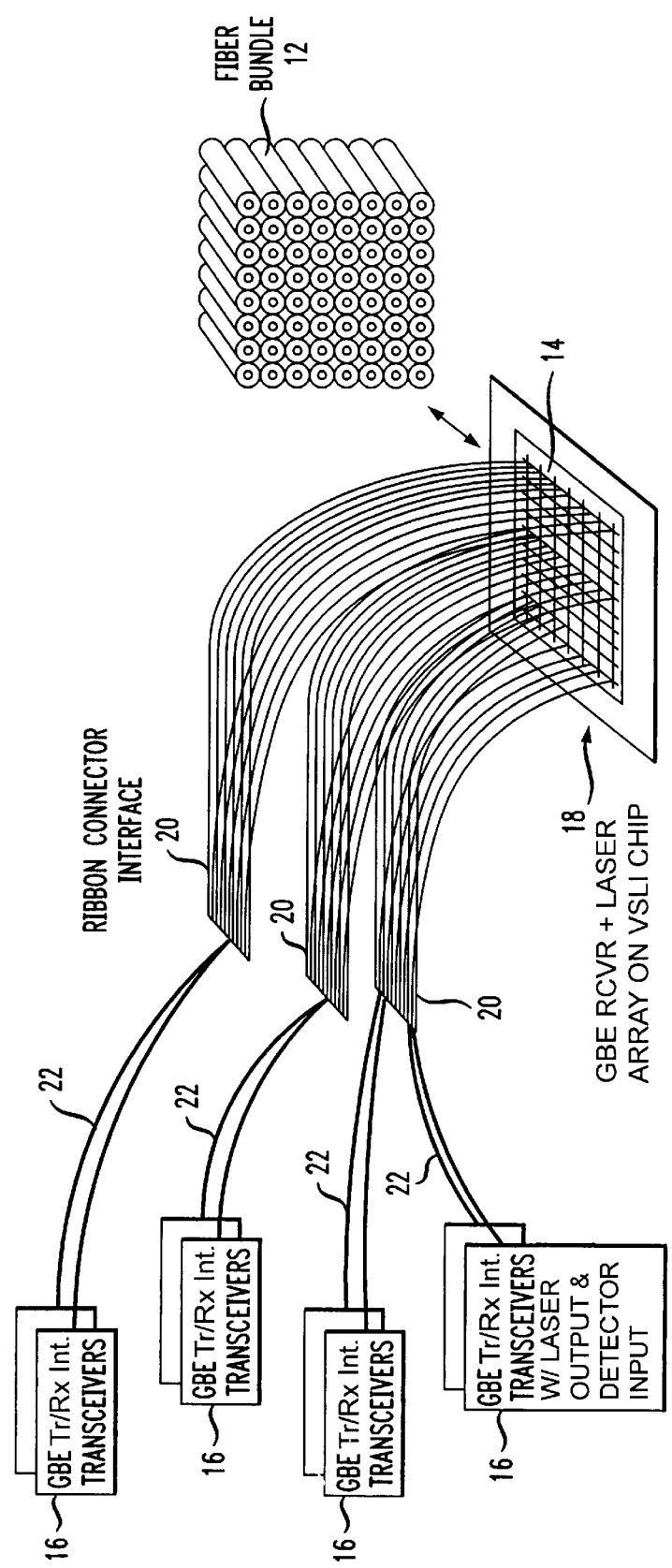
FIG. 1 illustrates the parallel transmission of Gigabit Ethernet optical signals to and from an optoelectronic-VLSI chip using a fiber bundle at the chip.

FIG. 1 shows a system to provide parallel communication between multiple discrete Gigabit Ethernet optical transceivers (each including a laser output and a detector input) and an optoelectronic-VLSI chip which contains hundreds of integrated optical transceiver receivers and lasers using a fiber-bundle composed of step-index fibers according to the invention. As will be appreciated, in order to accomplish this parallel transmission, a fiber bundle 12 is employed, having a first end connected to the ribbon connector interface 20 and a second connected to the receivers and lasers of the VLS1 chip at the surface 14 to deliver signals from the individual GbE transceivers 16 to the VSL1 chip 18 (upstream path)

and also to communicate signals from the chip 18 back to the transceivers 16 (downstream path)—the bottom-most transceiver in FIG. 1 indicating its included laser output and detector input omitted from the showings of FIG. 1 as to the remaining transceivers only for the sake of brevity. Individual fiber patch cords 22 are employed as jumpers to connect individual transmitter and receiver interfaces of the individual GbE transceivers 16 and the ribbon connector interface 20. Because of the existing technology in having commercially available only step-index fiber bundles, step-index (SI) fibers are employed in accordance with the invention as the bundle 12, instead of the graded-index (GI) fiber which supports the Gigabit Ethernet standard for data transmission at the 1.25 Gigabit-per-second rate. While commercially available, the core-size of the step-index-fiber bundle exhibits a ±4–5 microns fabrication error, which has been noted to introduce modal noise in both the upstream and downstream portions of the communications links. The effect of this modal noise is substantially reduced, however, in accordance with the teachings of the present invention.

Figure 2:
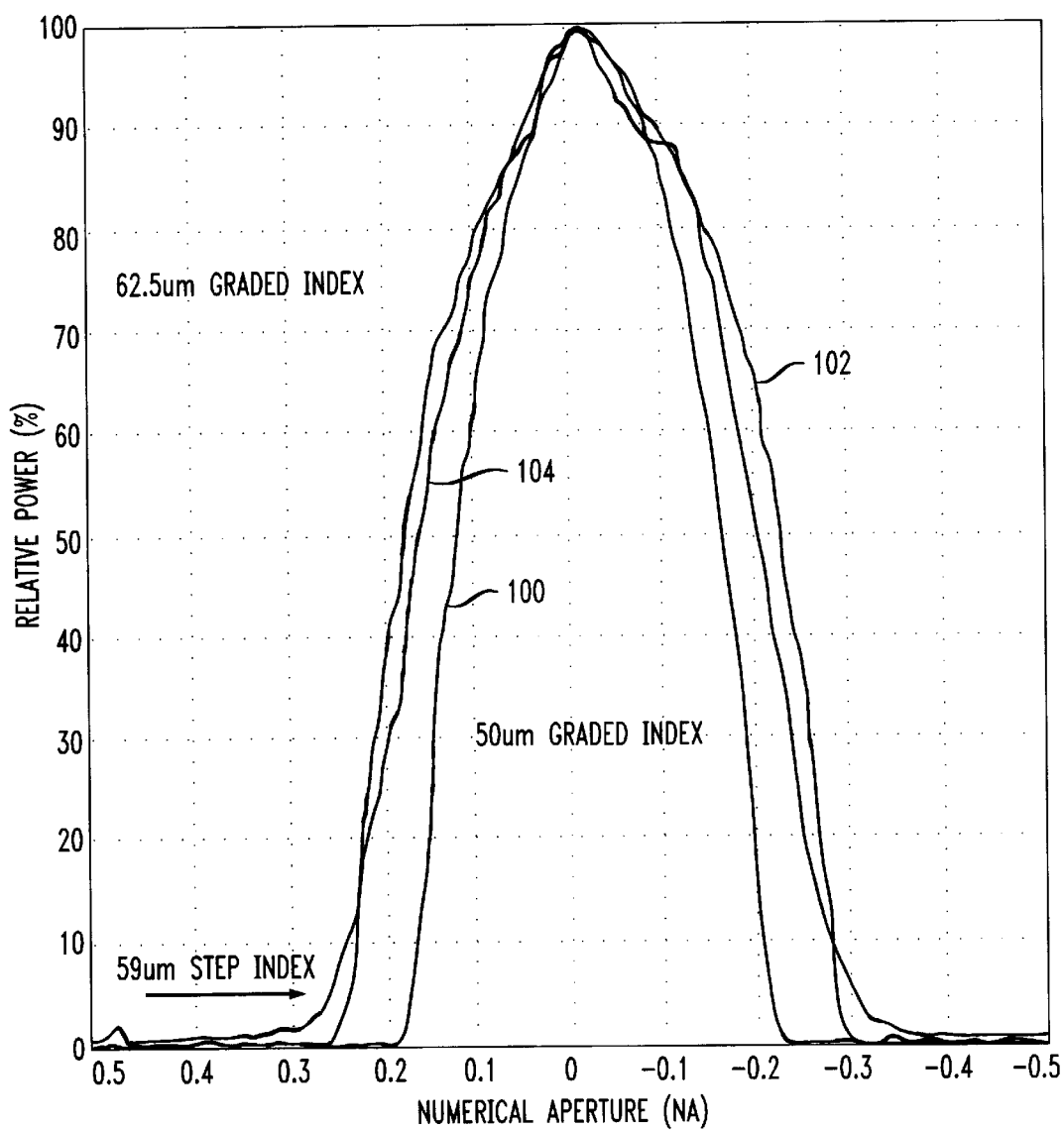
FIG. 2 is a graph showing the numerical aperture characteristics of standard 50 um and 62.5 um graded-index fibers as compared to that of a 59 um step-index fiber selected in accordance with the invention.

To be more specific, the present invention proceeds upon the realization that if all of the light is collected at the fiber-jumper-to-ribbon-connector interfaces, modal noise can be minimized. This follows from an appreciation of the graph of FIG. 2 which plots the relative power along the Y-axis of the GbE standard 50 um-core and 62.5 um-core graded-index fiber as a function of its numerical aperture, measured along the X-axis. Reference numeral 100, in particular, represents the plot for the standard 50 um-core GI fiber, while reference numeral 102 represents the plot for the 62.5 um-core GI fiber. In accordance with the present invention, and so as to ensure that all the light is collected at the interfaces, a step-index (SI) fiber is selected for the bundle 12 to exhibit a numerical aperture larger than that of the 50 um-core GI fiber, and less than the numerical aperture of the 62.5 um-core GI fiber—as shown by the reference numeral 104 in FIG. 2. In the system depicted in FIG. 1, then, the 62.5 um-core GI graded-index fiber is employed between the ribbon connector interface and the receivers of the individual GbE transceivers in the downstream communication, where the output GI fiber has a numerical aperture greater than that of the input SI fiber—as a result, substantially all of the light in the SI fibers is captured and coupled into the corresponding GI fibers which are then connected to the corresponding receivers at the GbE transceivers (less a small coupling loss due to light reflection). In accordance with the invention, furthermore, for the upstream communication, the standard 50 um-core GI fiber is employed from the individual transmitters to the SI fibers in the bundle which correspond to the receivers on the chip—and, because the numerical aperture of the SI fiber is greater than that of the standard 50 um-core GI fiber, substantially all of the light is coupled from the 50 um-core GI fiber into the SI fiber and an efficient link is obtained between the GbE transmitter and the corresponding receiver on the optoelectronic-VLSI chip. The requirement for the SI fiber bundle in this respect is that its mean core-size be specified so as to ensure that the numerical aperture of the SI fiber falls between that of the standard 50 um-core GI fiber and the standard 62.5 um-core GI fiber. Because fabrication error can be as much as ±4–5 microns, a 55 um core-size is preferably selected for the SI fiber—and with such tolerance, exhibits a numerical aperture between 0.19 and 0.25.

As will be understood by those skilled in the art, with the standard Gigabit Ethernet 50 um GI fiber jumper having a measured numerical aperture of less than 0.19 and with the standard Gigabit Ethernet 62.5 um GI fiber having a measured numerical aperture of greater than 0.25, substantially all of the light coupled from each transmitter interface into the 50 um GI fiber will be collected by the corresponding SI fiber, while substantially of the light coupled into the SI fiber will be collected by the corresponding 62.5 um GI fiber jumper. Since the step-index fibers in the bundle thus essentially act as a mode-scrambler, the use of smaller, more power efficient vertical cavity surface emitting lasers can be employed on the optoelectronic-VLSI chip which emit fewer modes, without incurring significant modal noise penalties. As these lasers have smaller apertures and lower threshold currents, they can be easier to integrate into dense arrays due to their overall lower power dissipation, again making it easier to integrate a large number of transceivers onto a single chip.

While there has been described what is considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

We claim:

1. An optical communications system comprising:
   a plurality of discrete Gigabit Ethernet optical transceivers having individual transmitter and receiver interfaces, and an array of Gigabit Ethernet receivers and lasers integrated on an optoelectronic-VLISI chip; and
   an optical commnunications link providing parallel communication therebetween;
   with said optical communications link including a connector interface having first and second ends, a first graded-index fiber jumper between each individual transmitter interface of said plurality of transceivers and said first end of said connector interface, a second graded-index fiber jumper between each individual receiver interface of said plurality of transceivers and said first end of said connector interface, and a fiber bundle of step-index fibers having a first end coupled to said second end of said connector interface and a second end coupled at a surface of said chip to said receivers and lasers integrated thereon.

2. The optical communications system of claim 1 wherein said step-index fibers are selected of a core size and numerical aperture in comparison with the core size and numerical aperture of said first graded-index fiber jumper so that substantially all of the light coupled from each transmitter interface is captured by corresponding step-index fibers in said fiber bundle.

3. The optical communications system of claim 1 wherein said step-index fibers are selected of a core size and numerical aperture in comparison with the core size and numerical aperture of said second graded-index fiber jumper so that substantially all of the light coupled into said step-index fiber bundle from said integrated lasers is captured by said second graded-index fiber jumper and delivered to corresponding individual receiver interfaces.

4. The optical communications system of claim 1 wherein said step-index fibers are selected of a core size and numerical aperture in comparison with the core size and numerical aperture of said first graded-index fiber jumper so that substantially all of the light coupled from each transmitter interface is captured by corresponding step-index fibers in said fiber bundle, and wherein said step-index fibers are selected of a core size and numerical aperture in comparison with the core size and numerical aperture of said second graded-index fiber jumper so that substantially all of the light coupled into said step-index fiber bundle from said integrated lasers is captured by said second graded-index fiber jumper and delivered to corresponding individual receiver interfaces.

5. The optical communications system of claim 2 wherein said step-index fiber bundle includes fibers of a core size and numerical aperture greater than the core size and numerical aperture of said first graded-index fiber jumper.

6. The optical communications system of claim 3 wherein said step-index fiber bundle includes fibers of a core size and numerical aperture less than the core size and numerical aperture of said second graded-index fiber jumper.

7. The optical communications system of claim 4 wherein said step-index fiber bundle includes fibers of a core size and numerical aperture greater than the core size and numerical aperture of said first graded-index fiber jumper, and less than the core size and numerical aperture of said second graded-index fiber jumper.

8. The optical communications system of claim 7 wherein said first graded-index fiber jumper, said second graded-index fiber jumper and said fiber bundle of step-index fibers have core sizes at a wavelength of 850 nm of 50 um, 62.5 um and 50–62.5 um, respectively.

9. The optical communications system of claim 4 wherein said VLSI chip employs an array of Gigabit Ethernet optical transceivers and vertical cavity surface emitting lasers.

10. The optical communications system of claim 9 wherein said VLSI chip employs an array of hundreds of Gigabi Ethernet transceivers and vertical cavity surface emitting lasers.

11. An optical communications system comprising:
   a multiple of discrete Gigabit Ethernet optical transceivers and an optoelectronic- VLSI chip containing hundreds of optical transceivers, with each optical transceiver including a laser output and a detector input;
   a fiber optic bundle of step-index fibers delivering signals from individual laser outputs of said Gigabit Ethernet transceivers to said chip and communicating signals from said chip back to individual detector inputs of said Gigabit Ethernet transceivers;
   a connector interface;
   a first graded-index fiber jumper coupled via said interface between the laser output of each Gigabit Ethernet optical transceiver and said fiber optic bundle; and
   a second graded-index fiber jumper coupled via said interface between the detector input of each Gigabit Ethernet optical transceiver and said fiber optic bundle.

12. The optical communication system of claim 11 wherein said step-index fibers are selected of a core size and numerical aperture in comparison with the core size and numerical aperture of said first graded-index fiber jumper so that substantially all of the light coupled from said laser outputs of said Gigabit Ethernet optical transceivers is captured by corresponding step-index fibers in said fiber bundle.

13. The optical communication system of claim 11 wherein said step-index fibers are selected of a core size and numerical aperture in comparison with the core size and numerical aperture of said second graded-index fiber jumper so that substantially all of the light coupled into said step-index fiber bundle from said laser outputs from said optical transceivers on said chip is captured by said second graded-index fiber jumper.

14. The optical communication system of claim 12 wherein said first graded-index fiber jumper collects substantially all the light from said laser output of said Gigabit Ethernet optical transceivers for coupling into said detector inputs on said chip.

15. The optical communication system of claim 13 wherein said a second graded-index fiber jumper couples substantially all the light from said laser output on said optical transceivers of said chip into said detector inputs of said Gigabit Ethernet optical transceivers.

16. The optical communication system of claim 11 wherein said step-index fiber includes fibers of a core size and numerical aperture greater than the core size and numerical aperture of said first graded-index fiber jumper, and less than the core size and numerical aperture of said second graded-index fiber jumper.

17. An optical communication system comprising:
   a plurality of discrete Gigabit Ethernet optical transceivers having individual transmitter and receiver interfaces, and an array of Gigabit Ethernet receivers and lasers arranged as optoelectronic transceivers on a VLSI chip; and
   an optical commnunications link providing signal communication between individual ones of said discrete transceivers and said optoelectronic transceivers;
   with said optical communications link including a fiber bundle of step-index fibers at a surface of said chip, a first graded-index fiber jumper and a connector interface coupled between individual transmitter interfaces of said discrete transceivers and said fiber bundle, and a second graded-index fiber jumper and said connector interface coupled between individual receiver interfaces of said discrete transceivers and said fiber bundle;
   wherein said step-index fiber bundle includes fibers of a core size and numerical aperture greater than the core size and numerical aperture of said first graded-index fiber jumper and less than the core size and numerical aperture of said second graded-index fiber jumper.

18. The optical communication system of claim 17 wherein said first graded-index fiber jumper, said second graded-index fiber jumper and said step-index fibers of said fiber bundle have core sizes at a wavelength of 850 nm of 50 $\mu$m, 62.5 $\mu$m and 50–62.5 $\mu$m, respectively.

* * * * *